United States Patent
Leung et al.

(10) Patent No.: US 8,505,859 B2
(45) Date of Patent: Aug. 13, 2013

(54) GARDEN EDGE SPIKE AND METHODS AND USES THEREOF

(75) Inventors: Sue-Anne Tean Leung, Hong Kong (CN); Eddie Ping Kuen Li, Hong Kong (CN)

(73) Assignee: Huizhou Light Engine Ltd., Huizhou (CN)

(*) Notice: Subject to any disclaimer, the term of this patent is extended or adjusted under 35 U.S.C. 154(b) by 0 days.

(21) Appl. No.: 13/069,198

(22) Filed: Mar. 22, 2011

(65) Prior Publication Data
US 2011/0226916 A1 Sep. 22, 2011

Related U.S. Application Data

(60) Provisional application No. 61/316,265, filed on Mar. 22, 2010.

(51) Int. Cl.
*A47G 29/00* (2006.01)

(52) U.S. Cl.
USPC .............. 248/87; 248/156; 248/530; 248/545

(58) Field of Classification Search
USPC ................ 248/530, 545, 85, 87, 219.4, 156, 248/223.41, 224.51, 312.1, 316.7, 507, 508, 248/535, 688, 539, 538; 40/645
See application file for complete search history.

(56) References Cited

U.S. PATENT DOCUMENTS

| | | | | |
|---|---|---|---|---|
| 982,597 A * | 1/1911 | Habig | | 248/88 |
| 2,926,874 A * | 3/1960 | Hahn | | 248/514 |
| 3,809,348 A * | 5/1974 | Di Laura | | 248/49 |
| 3,941,342 A * | 3/1976 | Bradshaw | | 248/88 |
| 4,135,668 A * | 1/1979 | Winkler et al. | | 239/276 |
| 4,870,548 A * | 9/1989 | Beachy et al. | | 362/145 |
| 4,913,389 A * | 4/1990 | McCracken | | 248/156 |
| 4,948,293 A * | 8/1990 | Smith | | 405/36 |
| 5,027,551 A | 7/1991 | Rodriguez | | |
| 5,280,417 A * | 1/1994 | Hall et al. | | 362/640 |
| 5,365,689 A * | 11/1994 | Holliman | | 43/21.2 |
| 5,488,550 A * | 1/1996 | Yang | | 362/298 |
| 5,597,229 A * | 1/1997 | Plichta et al. | | 362/153.1 |
| 5,636,815 A * | 6/1997 | Wilson | | 248/125.9 |
| 5,667,174 A * | 9/1997 | Adams | | 248/156 |
| 6,439,744 B1 * | 8/2002 | Chanslor | | 362/249.01 |
| D469,566 S * | 1/2003 | Gary et al. | | D26/138 |
| 6,527,246 B1 * | 3/2003 | Stinnett | | 248/545 |

(Continued)

FOREIGN PATENT DOCUMENTS

CN 201093222 Y 7/2008

OTHER PUBLICATIONS

CabLED™ from OptiLED Lighting International Ltd. (http://cabled.optiled.com/; http://cabled.optiled.com/MyImage/image/Web/CabLED%20brochure%20final.pdf).

(Continued)

*Primary Examiner* — Terrell McKinnon
*Assistant Examiner* — Eret McNichols
(74) *Attorney, Agent, or Firm* — Schiff Hardin LLP (57) ABSTRACT

A garden edge spike includes: a tapered spike portion having a lower spike and an upper C-shaped portion having a plurality of grooves on an outer edge thereof; and a holder, the holder having a holding portion including plural flanges, and a coupling portion that slideably engages one or more of the plurality of grooves.

7 Claims, 8 Drawing Sheets

(56) References Cited

U.S. PATENT DOCUMENTS

| | | | | |
|---|---|---|---|---|
| 8,286,892 | B1* | 10/2012 | Schwanebek | 239/1 |
| 2004/0148878 | A1* | 8/2004 | Somerville | 52/165 |
| 2006/0097124 | A1* | 5/2006 | Kenney | 248/530 |
| 2008/0184619 | A1 | 8/2008 | Heighton | |

OTHER PUBLICATIONS

Rigid Light Strip™ from Light Engine Ltd. (http://www.lightengine-tech.com/en/generallighting3_detail.asp?ID=38&CATID=38; http://www.lightengine-tech.com/upload/PRODUCTG_PL38.pdf).

Flexible Light Strip™ from Light Engine Ltd. (http://www.lightengine-tech.com/en/generallighting3_detail.asp?ID=40&CATID=40; http://www.lightengine-tech.com/upload/PRODUCTG_PL40.pdf).

PCT Notification of Transmittal of the International Search Report and The Written Opinion of the International Searching Authority, or the Declaration dated May 20, 2011 in connection with PCT International Application No. PCT/US2011/029445.

* cited by examiner

GARDEN EDGE SPIKE AND METHODS AND USES THEREOF

CROSS-REFERENCE TO RELATED APPLICATION

This application claims benefit under 35 U.S.C. §119(e) to U.S. Provisional Patent Application Ser. No. 61/316,265, filed Mar. 22, 2010, which is hereby incorporated herein by reference.

Throughout this application, several publications are referenced. Disclosure of these publications in their entirety is hereby incorporated by reference into this application.

BACKGROUND OF THE INVENTION

The present invention relates to a garden edge spike configured to adjustably hold a strip, tube, rope or other items at various angles. In a preferred embodiment, the strip, tube or rope can be a lighting strip, tube or cable and the spike can hold the lighting strip, tube or rope at various angles. The present invention also relates to methods and kits for installing a lighting apparatus which involve at least one garden edge spike.

Up to now, lighting of lawns and gardens has typically been performed using a series of electric light bulbs in fixtures arranged at various points around the lawn or garden. One disadvantage of this method is the necessity to provide electrical underground wiring to supply electrical power to each light fixture. Such wiring requires that the lawn or garden be dug up, so that electrical wiring can be placed underground, preferably deep enough so as not to be cut by typical outdoor activities, such as gardening.

Alternatively, rope lighting products have been used to illuminate or accent lawns, gardens and other outdoor features (such as trees, gazebos, patios, decks, steps, paths, ponds, and pools). Currently, the following methods are used in the outdoor installation of rope lighting products: (i) wrapping such products around an object (e.g, a tree trunk or a deck's hand rails or posts); (ii) using lighting mounting clips which are attached to a mounting surface (e.g., wall, side of a deck); (iii) using mounting tracks; or (iv) simply laying the rope lighting products on the ground. These techniques are particularly limiting when attempting to install outdoor lighting in lawns, gardens, or pathways. By way of example, mounting tracks are limited by their pre-formed shape. Thus, if a person wishes to accent a sinewy pathway using a rope lighting product and mounting tracks, he/she would need to get their mounting tracks custom-made to match the outer contours of the sinewy pathway. Further, the person may be required to purchase a great length of mounting track to complete the installation project, and may find it frustrating feeding a great length of rope lighting product into a great length of mounting track. By way of another example, if the person with the same sinewy pathway decides to just lay a rope lighting product alongside the contours of the pathway, such product is highly prone to move from its intended position.

BRIEF SUMMARY OF THE INVENTION

In consideration of the above problems, in accordance with one aspect, a garden edge spike includes: a tapered spike portion having a lower spike and an upper C-shaped portion having a plurality of grooves on an outer edge thereof; and a holder, the holder having a holding portion including plural flanges, and a coupling portion that slideably engages one or more of the plurality of grooves. In an aspect of the present invention, the holding portion is a strip, tube or rope holding portion.

In another aspect, the present invention is directed to a method for installing a lighting apparatus which comprises the steps of impacting or pushing at least one garden edge spike disclosed herein to bury at least a portion of the tapered spike portion of the garden edge spike into the ground, and attaching the lighting apparatus to the at least one garden edge spike.

In another aspect, the present invention is directed to a method for installing a lighting apparatus which comprises the steps of attaching the lighting apparatus to at least one garden edge spike disclosed herein, and impacting or pushing the at least one garden edge spike to bury at least a portion of the tapered spike portion of the garden edge spike into the ground.

In another aspect, the present invention is directed to a lighting installation kit comprising the garden edge spike of disclosed herein. In another aspect, the kit further comprises directions for installation.

BRIEF DESCRIPTION OF THE DRAWINGS

The figures are for illustration purposes only and are not necessarily drawn to scale. The invention itself, however, may best be understood by reference to the detailed description which follows when taken in conjunction with the accompanying drawings in which.

DETAILED DESCRIPTION OF THE INVENTION

Figure 1:
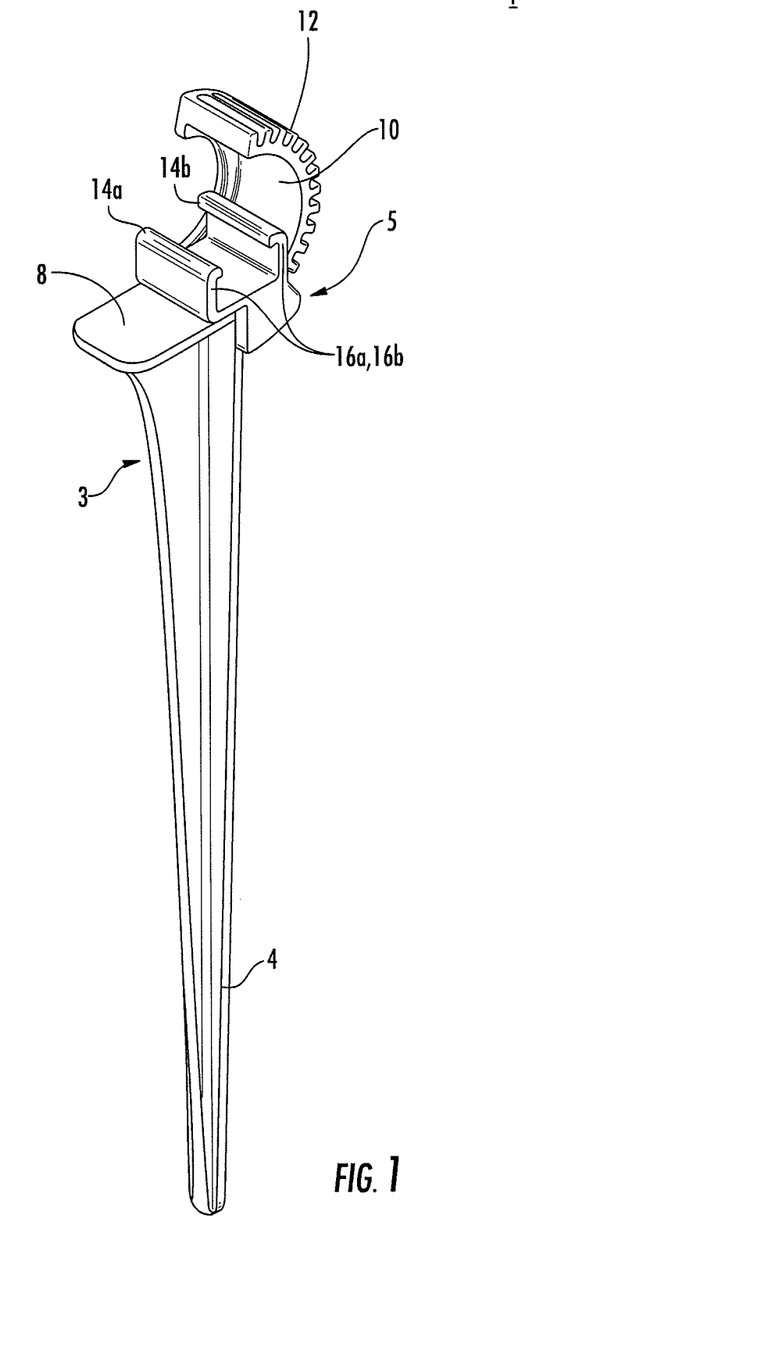
FIG. 1 is a perspective view of an assembled garden edge spike in accordance with an aspect of the present invention.
Figure 2:
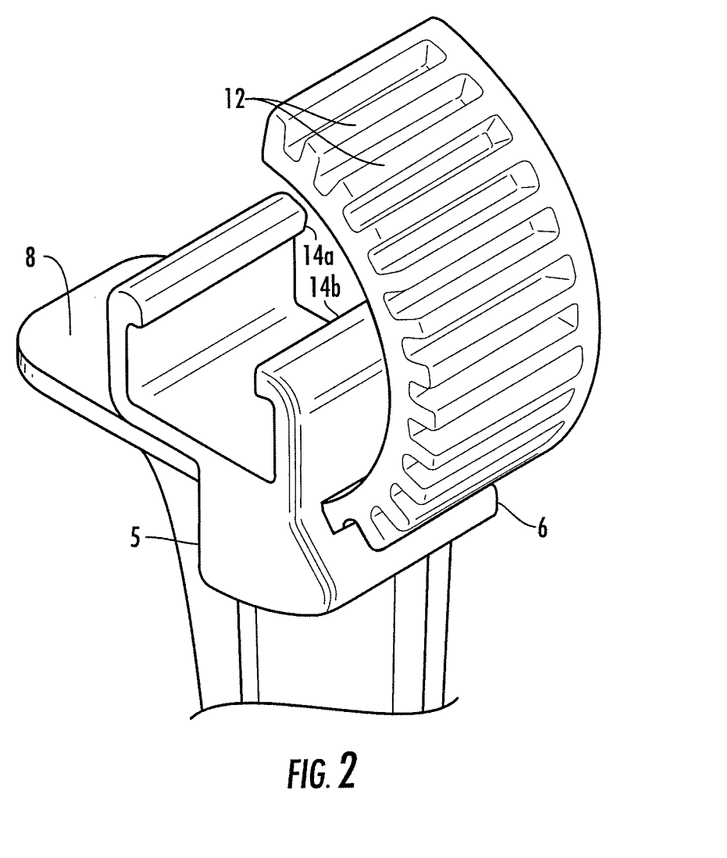
FIG. 2 is a detail view of the assembled garden edge spike as shown in FIG. 1.

FIGS. 1-8 illustrate a preferred embodiment of a garden edge spike in accordance with the present invention. As can be seen in the figures, a garden edge spike 1 in accordance with the present invention is formed of two components, a spike portion 3, and a holder 5. FIG. 1 shows the garden edge spike 1 in its assembled state. The spike portion 3 includes a lower spike 4, which is preferably tapered to some extent, e.g., to a point, to permit it to be easily impacted (such as hammered or stomping) or pushed into the ground, a platform section 8, which provides a surface for impacting or pushing the garden edge spike 1 into the ground, and a C-shaped portion 10, having plural grooves 12 on its outer surface.

Figure 3:
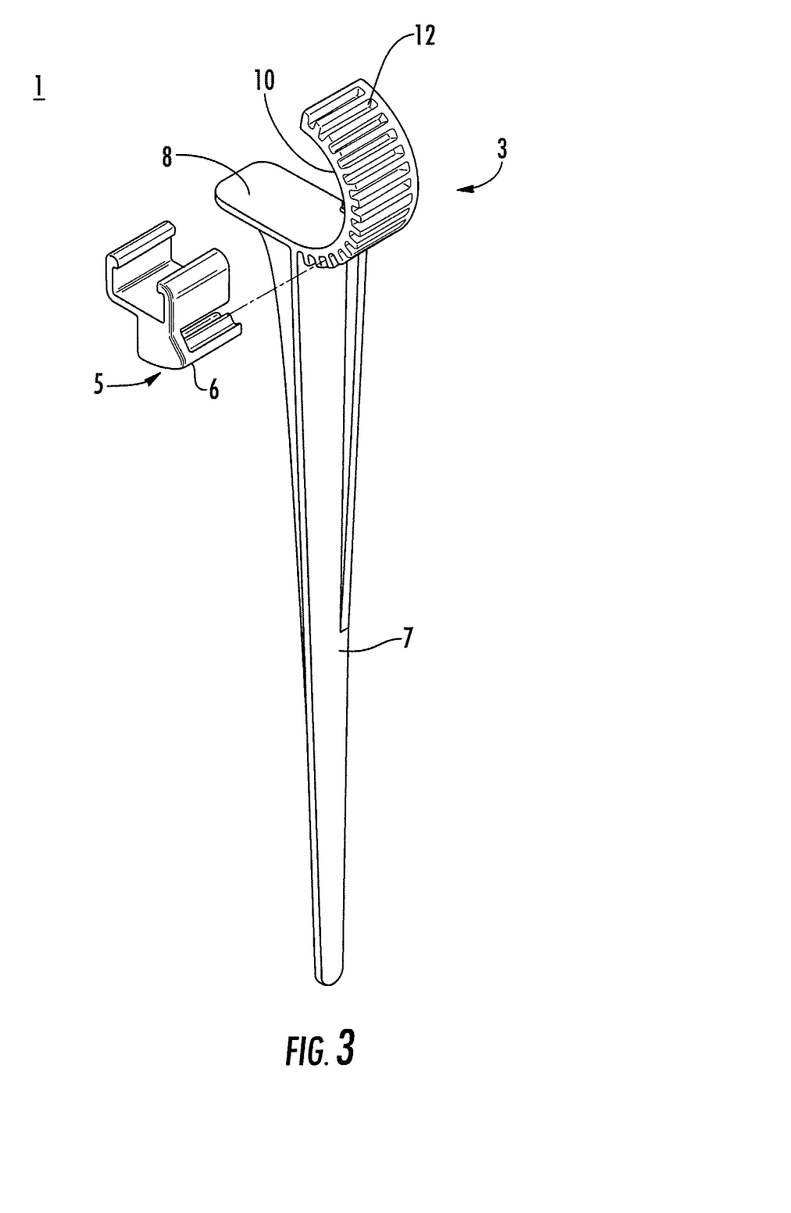
FIG. 3 is a view of a disassembled garden edge spike in accordance with an aspect of the present invention.
Figure 4:
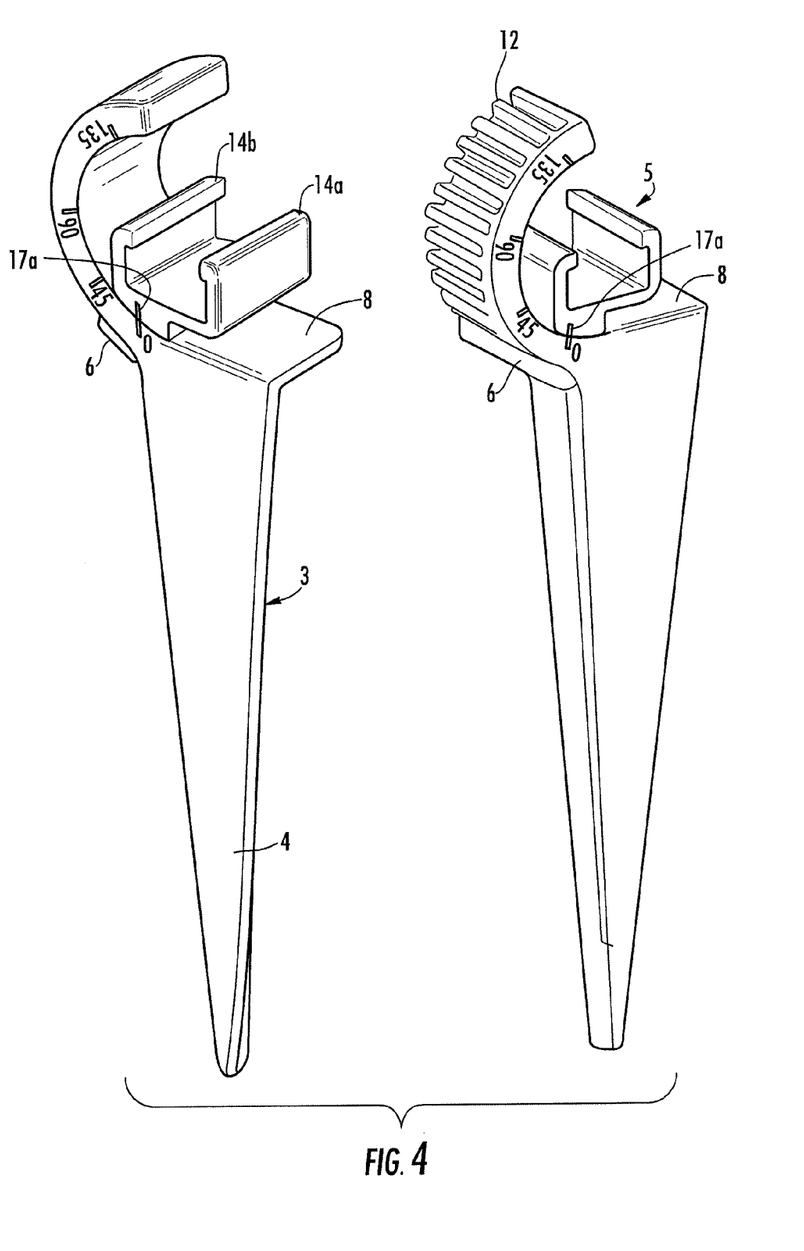
FIG. 4 shows front and back perspective views of an assembled garden edge spike in accordance with an aspect of the present invention.
Figure 5:
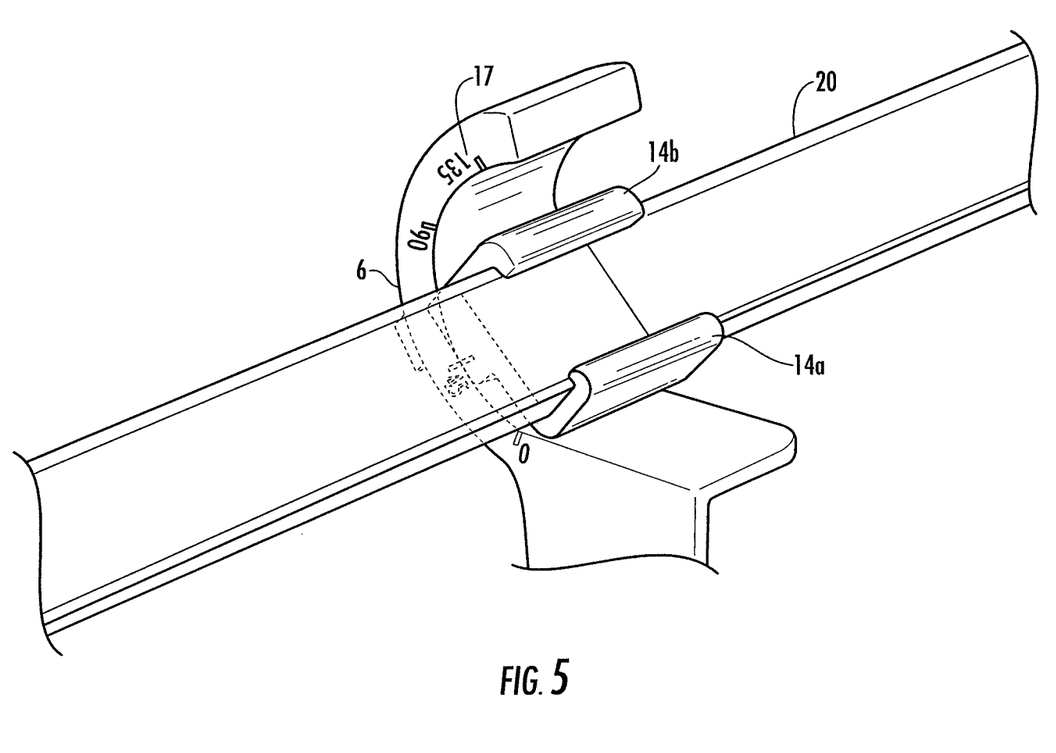
FIG. 5 is a perspective view of a top portion of the garden edge spike holding a strip.
Figure 7:
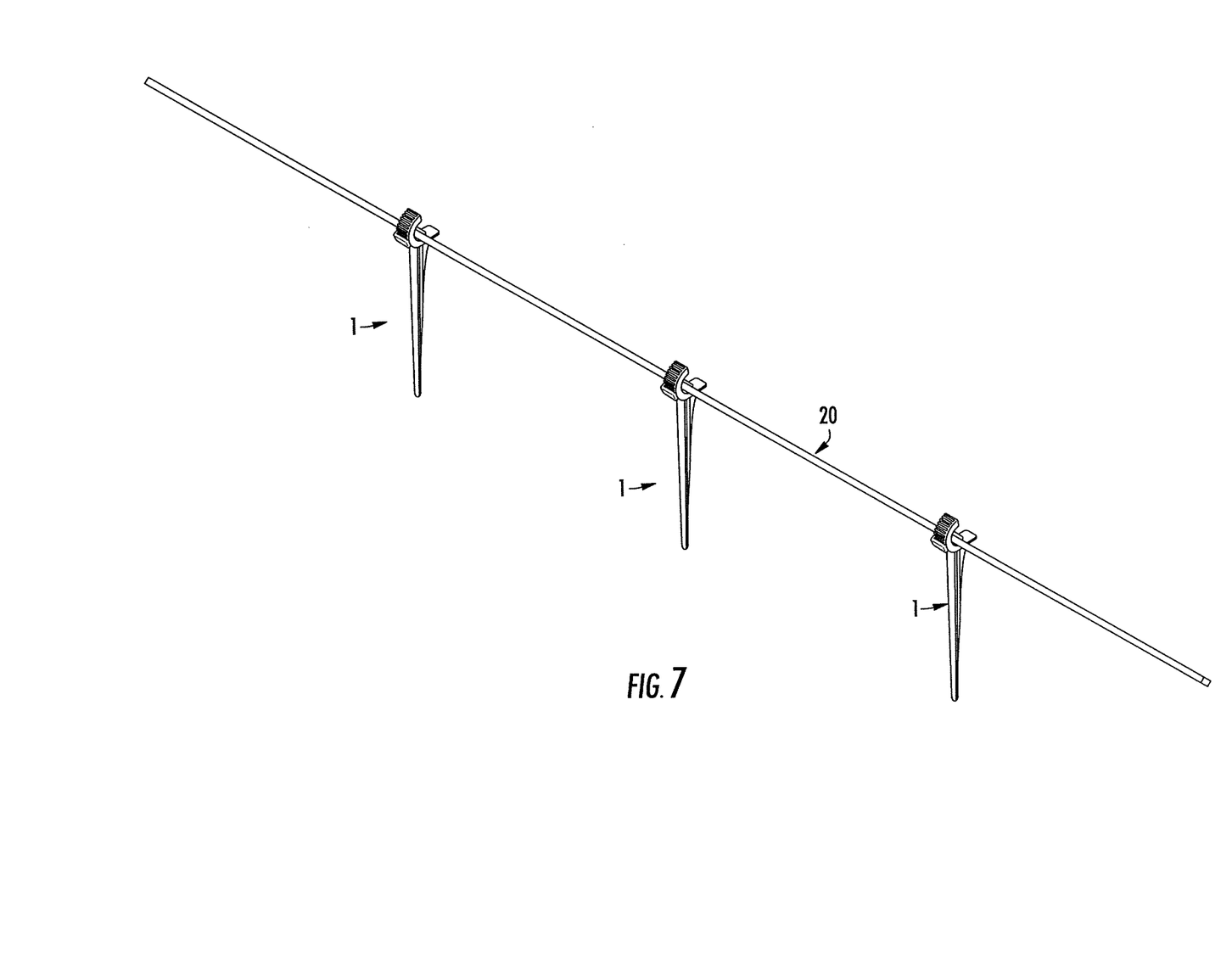
FIG. 7 is a view of plural garden edge spikes in accordance with an aspect of the present invention used together to support a lengthwise strip.

The holder 5 (which, as illustrated in FIGS. 5 and 7, can be a strip holder) includes a coupling portion 6, shaped to slideably engage the C-shaped portion 10, and a holding portion including walls 16a and 16b, having flanges 14a and 14b, respectively. FIG. 3 shows the spike portion 3 and the holder 5 separately, while FIG. 1, for example, shows the assembled garden edge spike.

The provision of the plural grooves 12 allows for the slideable engagement between the coupling portion 6 of the holder 5 and the grooves 12 of the C-shaped portion 10 to be made at different angles, depending on which groove or set of grooves from among the plural grooves 12 is/are engaged by the coupling portion 6 when the holder 5 is slideably engaged with the C-shaped portion 10.

Figure 8:
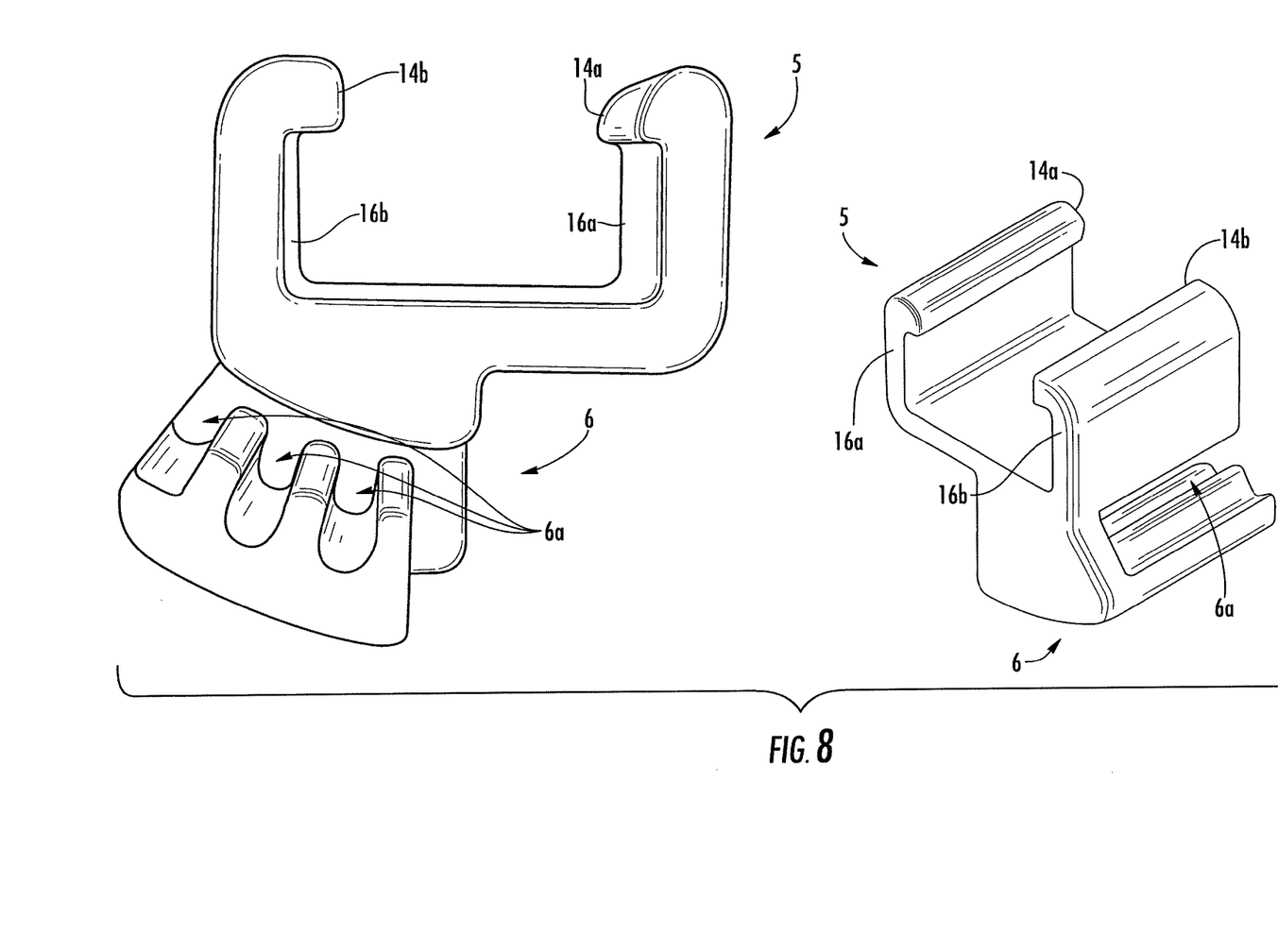
FIG. 8 includes side and perspective views of the holding portion in accordance with an aspect of the present invention.

As can be seen in FIG. 8, the coupling portion 6 is shaped so as to permit the holder 5 to slide onto the grooves 12. In a preferred embodiment, the coupling portion 6 defines a female portion 6a of the holder 5 that can receive one or more of the grooves 12, allowing the holder 5 to slide onto the C-shaped portion 10 from the side. Because of the shape of the female portion 6a that engages the groove or grooves 12, once slideably engaged, the holder 5 will not move in a vertical direction, i.e., the angle of engagement between the C-shaped portion and the holder 5 is maintained, until the holder is removed by sliding it out of the grooves.

Figure 6:
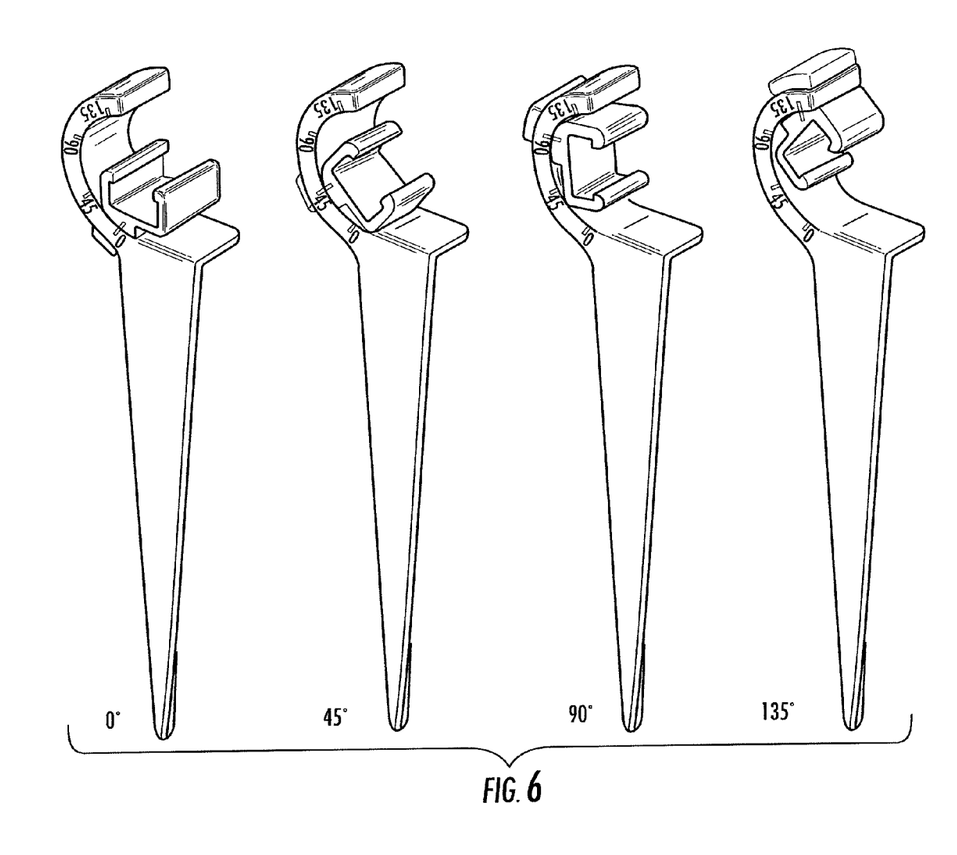
FIG. 6 shows multiple views of the garden edge spike showing the holding portion at four different angles.

As can be seen from FIG. 6, the holder 5 can, for example, engage the C-shaped section so as to hold a strip 20 (the strip not forming a part of the present invention) at angles of 0, 45, 90 and 135 degrees, as shown. Of course, the invention is not limited to the particular angles shown and the angles provided by, e.g., the spacing of the grooves, can be any desired set of angles.

FIG. 5 illustrates the assembled garden edge spike 1 holding a strip at a 45 degree angle. In a preferred embodiment, to assist in a user inserting the holder 5 at an appropriate angle, angle indicia 17 may be provided on at least one edge of C-shaped portion 10 (see, e.g., FIG. 5), and a guide angle indicia 17a may be provided on at least one side of holder 5 (see, e.g., FIG. 4). By lining up guide angle indicia 17a with a specific angle indicia 17, a user will know the angle of engagement (e.g., 0°, 45°, 90°, or 135°) that will be effected by slideably engaging the holder 5 at this portion of the C-shaped portion 10.

As can be seen from FIG. 5, in one use of the garden edge spike 1, the strip 20 can held in place by, e.g., sliding into place under flanges 14a and 14b, or by snapping into the edges of the strip into place under those flanges. Once snapped or slid into place, the strip 20 is securely held, and at the desired angle, within the space formed by the vertical walls 16a and 16b, and the flanges 14a and 14b.

FIG. 7 illustrates a typical use of the garden edge spike 1. As shown in the figure, a plurality of garden edge spikes 1 can be arranged to provide support for a relatively long strip 20. As will be understood by those skilled in the art, the longer and more flexible the strip, the more garden edge spikes 1 might be needed, over any given distance, to provide support for the strip.

The garden edge spike 1 of the present invention is particularly useful for supporting lighting products, including, but without limitation:

CabLED™ from OptiLED Lighting International Ltd. (http://cabled.optiled.com/; http://cabled.optiled.com/MyImage/image/Web/CabLED%20brochure%20final.pdf);

Rigid Light Strip™ from Light Engine Ltd. (http://www.lightengine-tech.com/en/generallighting3_detail.asp?ID=38&CATID=38; http://www.lightengine-tech.com/upload/PRODUCTG_PL38.pdf); and Flexible Light Strip™ from Light Engine Ltd. (http://www.lightengine-tech.com/en/generallighting3_detail.asp?ID=40&CATID=40; http://www.lightengine-tech.com/upload/PRODUCTG_PL40.pdf).

The adjustable nature of the angle of the holder 5 in the garden edge spike 1 allows the light provided from lighting products (such as those listed above) to be directionally controlled, as lighting from such lighting products typically is emitted most strongly in a particular direction.

While the holder 5 as illustrated in the drawings is particularly suited for holding lengthwise strips, the invention is not limited to this configuration. As would be understood by one of skill in the art, the holder 5 may alternatively be configured to allow it to hold other products, either in conjunction with other garden edge spikes, or by an individual garden edge spike. Such products could include, but are not limited to, individual lights, tubular products, including but not limited to tube-shaped lighting, rope-like products, such as rope lighting, Christmas lights, and the like.

The garden edge spike 1 can be made of polycarbonate (PC), PVC, polypropylene (PP), ABS, or the like.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A garden edge spike comprising:
a tapered spike portion having a lower spike which has a top end and a bottom end, a platform section located at the top end of the lower spike, and disposed in a plane transverse to the lower spike, and an upper upright C-shaped portion located at the top end of the lower spike and extending circumferentially away from the platform section, the upper upright C-shaped portion having a plurality of grooves that is circumferentially spaced apart along an outer circumferential edge thereof; and
a removable holder, the removable holder having a holding portion including plural flanges, and a coupling portion having a female portion with a plurality of grooves, wherein the female portion slideable engages one or more of the plurality of grooves of the upper upright C-shaped portion, to position the removable holder on the upper upright C-shaped portion.

2. The garden edge spike of claim 1, wherein the holding portion is shaped to hold a strip-shaped, tube-shaped, or rope-shaped apparatus.

3. The garden edge spike of claim 1, wherein the upper upright C-shaped portion further having at least one angle indicia on a side edge thereof.

4. The garden edge spike of claim 3, wherein the at least one angle indicia indicates "0°", "45°", "90°", or "135°".

5. The garden edge spike of claim 3, wherein the holder has a guide angle indicia, wherein by lining up the guide angle indicia with one of the at least one angle indicia on the side edge of the upper upright C-shaped portion, a user will know an angle of engagement.

6. A method for installing a lighting apparatus using at least one garden edge spike comprising:
a tapered spike portion having a lower spike which has a top end and a bottom end, a platform section located at the top end of the lower spike, and disposed in a plane transverse to the lower spike, and an upper upright C-shaped portion located at the top end of the lower spike and extending circumferentially away from the platform section, the upper upright C-shaped portion having a plurality of grooves that is circumferentially spaced apart along an outer circumferential edge thereof; and a removable holder, the removable holder having a holding portion including plural flanges, and a coupling portion having a female portion with a plurality of grooves, wherein the female portion slideable engages one or more of the plurality of grooves of the upper upright C-shaped portion, to position the removable holder on the upper upright C-shaped portion, which the method comprises the steps of:
(a) impacting or pushing the at least one garden edge spike to bury at least a portion of the tapered spike portion of the garden edge spike into the ground, and
(b) attaching the lighting apparatus to the at least one garden edge spike.

7. A method for installing a lighting apparatus using at least one garden edge spike comprising:

a tapered spike portion having a lower spike which has a top end and a bottom end, a platform section located at the top end of the lower spike, and disposed in a plane transverse to the lower spike, and an upper upright C-shaped portion located at the top end of the lower spike and extending circumferentially away from the platform section, the upper upright C-shaped portion having a plurality of grooves that is circumferentially spaced apart along an outer circumferential edge thereof; and a removable holder, the removable holder having a holding portion including plural flanges, and a coupling portion having a female portion with a plurality, wherein the female portion slideable engages one or more of the plurality of grooves of the upper upright C-shaped portion, to position the removable holder on the upper upright C-shaped portion, which the method comprises the steps of:
(a) attaching the lighting apparatus to at least one garden edge spike, and
(b) impacting or pushing the at least one garden edge spike to bury at least a portion of the tapered spike portion of the garden edge spike into the ground.

* * * * *